United States Patent
Kao et al.

(10) Patent No.: US 8,565,326 B2
(45) Date of Patent: Oct. 22, 2013

(54) SYSTEM AND METHOD FOR BIT ALLOCATION AND INTERLEAVING

(75) Inventors: Chien-Yu Kao, Sanchong (TW); Jen-Yuan Hsu, Jincheng Township (TW); Pang-An Ting, Fongyuan (TW); Chia-Lung Tsai, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 718 days.

(21) Appl. No.: 12/425,004

(22) Filed: Apr. 16, 2009

(65) Prior Publication Data

US 2010/0008438 A1    Jan. 14, 2010

Related U.S. Application Data

(60) Provisional application No. 61/079,104, filed on Jul. 8, 2008.

(51) Int. Cl.
*H04K 1/10* (2006.01)

(52) U.S. Cl.
USPC .......................................................... 375/260

(58) Field of Classification Search
USPC .......................................................... 375/260
See application file for complete search history.

(56) References Cited

U.S. PATENT DOCUMENTS

| | | | |
|---|---|---|---|
| 7,260,770 B2 | 8/2007 | Stewart et al. | |
| 7,506,238 B2 * | 3/2009 | Hocevar | 714/781 |
| 2003/0048462 A1 * | 3/2003 | Williams | 358/1.9 |
| 2005/0078764 A1 * | 4/2005 | Gresset et al. | 375/267 |
| 2005/0100108 A1 * | 5/2005 | Yun et al. | 375/260 |
| 2006/0251185 A1 | 11/2006 | Von Elbwart et al. | |
| 2008/0181191 A1 * | 7/2008 | Hillery et al. | 370/339 |
| 2009/0276671 A1 * | 11/2009 | Fang et al. | 714/748 |
| 2010/0246719 A1 * | 9/2010 | Ko et al. | 375/303 |

OTHER PUBLICATIONS

Yuan, "IEEE C802.16m-08/685r2, Bit Priority Mapping to enhance CTC IR HARQ performance" Jul. 8, 2008.*
Kao, "IEEE C802.16m-08/1144r1 New bit-rearrangement method to enhance HARQ performance", Sep. 5, 2008.*
Jette, "IEEE802.20-07-01 802.20 technical overview presentation" Feb. 15, 2007.*
Li, "IEEE802.16e-05-052r3 clarification on vertically encoded MIMO" Jan. 22, 2005.*
Fang, "IEEE802.16m-08-301 Enhancing CTC HARQ performance by bit rearrangement", IEEE May 5, 2008.*
Yuan, "IEEE C802.16m-08/685, Bit Priority Mapping to enhance CTC IR HARQ performance" Jul. 7, 2008.*

* cited by examiner

*Primary Examiner* — Juan A Torres
(74) *Attorney, Agent, or Firm* — Finnegan, Henderson, Farabow, Garrett & Dunner, LLP

(57) ABSTRACT

A method for transmitting data represented by a plurality of coded bits includes: allocating the coded bits to a plurality of groups; rearranging, for a retransmission of the coded bits, ones of the coded bits allocated to a first one of the plurality of groups to a second one of the plurality of groups, and ones of the coded bits allocated to the second one of the plurality of groups to the first one or a third one of the plurality of groups; and changing, for the retransmission, a sequence of coded bits allocated to each of the plurality of groups after the rearranging.

5 Claims, 16 Drawing Sheets

SYSTEM AND METHOD FOR BIT ALLOCATION AND INTERLEAVING

RELATED APPLICATIONS

This application is based upon and claims the benefit of priority from U.S. Provisional Patent Application No. 61/079,104, filed Jul. 8, 2008, the entire contents of which are incorporated herein by reference.

FIELD OF THE INVENTION

This invention relates to systems and methods for bit allocation and interleaving.

BACKGROUND

Hybrid automatic repeat request (HARQ) is a scheme to improve throughput performance of a communication system, such as an orthogonal frequency division multiplexing (OFDM) based communication system or a multi-input and multi-output (MIMO) system. Based on the HARQ scheme, error detection and correction may be performed on transmitted data, based on retransmission of the data.

For example, the HARQ scheme may include a type-I HARQ scheme, also referred to as a chase combining scheme, and a type-II HARQ scheme, also referred to as an incremental redundancy scheme. Based on the type-I HARQ scheme, a sequence of coded bits during a retransmission is typically the same as a sequence of the coded bits during a previous transmission. As a result, ones of the coded bits may always be mapped to high-reliability bit positions for a bit mapper in the communication system. Based on the type-II HARQ scheme, a sequence of coded bits during a retransmission is typically different from a sequence of the coded bits during a previous transmission. However, the bit mapper in the communication system typically does not perform bit mapping based on characteristics of the coded bits, such as bit significance. For example, ones of the coded bits may have a relatively higher level of significance than remaining ones of the coded bits. As a result, based on the type-II HARQ scheme, coded bits that have a relatively high level of significance may be mapped to low-reliability bit positions for the bit mapper in the communication system.

Traditionally, the HARQ scheme may be used after a channel encoder in the communication system performs channel encoding of source bits, representing original data to be transmitted, to generate the coded bits. For example, the channel encoder may include a convolutional turbo codes (CTC) encoder to perform channel encoding. The channel encoder may further include subblock interleavers to perform interleaving of the generated coded bits based on a subblock interleaving method.

FIG. 1 illustrates a conventional subblock interleaving method 100, according to IEEE standard 802.16e. An output of a CTC encoder (not shown) is separated into six data subblocks A 102, B 104, Y1 106, Y2 108, W1 110, and W2 112. The data subblocks A 102 and B 104 include systematic bits of an encoded bit sequence. The data subblocks Y1 106 and W1 110 include parity bits of the encoded bit sequence in an original order. The data subblocks Y2 108 and W2 112 include parity bits of the encoded bit sequence after interleaving. The six data subblocks A 102, B 104, Y1 106, Y2 108, W1 110, and W2 112 are further interleaved by subblock interleavers 122, 124, 126, 128, 130, and 132, respectively. As a result, as shown in FIG. 1, an output may be data subblocks A, B, Y1', Y2', W1', and W2'. The data subblocks A and B include the systematic bits, which have a relatively high level of significance. The data subblocks Y1', Y2', W1', and W2' include the parity bits, which have a relatively low level of significance.

SUMMARY

According to a first aspect of the present disclosure, there is provided a method for transmitting data represented by a plurality of coded bits, the method comprising: allocating the coded bits to a plurality of groups; rearranging, for a retransmission of the coded bits, ones of the coded bits allocated to a first one of the plurality of groups to a second one of the plurality of groups, and ones of the coded bits allocated to the second one of the plurality of groups to the first one or a third one of the plurality of groups; and changing, for the retransmission, a sequence of coded bits allocated to each of the plurality of groups after the rearranging.

According to a second aspect of the present disclosure, there is provided a transmitter for transmitting data represented by a plurality of coded bits, comprising: a bit allocation controller configured to allocate the coded bits to a plurality of groups; an intra-symbol interleaver configured to rearrange, for a retransmission of the coded bits, ones of the coded bits allocated to a first one of the plurality of groups to a second one of the plurality of groups, and ones of the coded bits allocated to the second one of the plurality of groups to the first one or a third one of the plurality of groups; and a plurality of inter-symbol interleavers each configured to change, for the retransmission, a sequence of coded bits allocated to one of the plurality of groups.

According to a third aspect of the present disclosure, there is provided a method for transmitting data represented by a plurality of coded bits, the plurality of coded bits corresponding to a plurality of resource blocks, the method comprising: allocating the plurality of coded bits to a plurality of subbands each including a first plurality of groups, to thereby allocate the plurality of coded bits to a second plurality of groups; interleaving, for a retransmission of the plurality of coded bits, coded bits allocated to each of the plurality of subbands; and changing, for the retransmission, a sequence of ones of the plurality of coded bits corresponding to a first one of the plurality of resource blocks and ones of the plurality of coded bits corresponding to a second one of the plurality of resource blocks.

According to a fourth aspect of the present disclosure, there is provided a transmitter for transmitting data represented by a plurality of coded bits, the plurality of coded bits corresponding to a plurality of resource blocks, the transmitter comprising: a bit allocation controller configured to allocate the plurality of coded bits to a plurality of subbands each including a first plurality of groups, to thereby allocate the plurality of coded bits to a second plurality of groups; a plurality of subband interleavers each configured to interleave, for a retransmission of the plurality of coded bits, coded bits allocated to each of the plurality of subbands; and a resource block interleaver configured to change, for the retransmission, a sequence of ones of the plurality of coded bits corresponding to a first one of the plurality of resource blocks and ones of the plurality of coded bits corresponding to a second one of the plurality of resource blocks.

According to a fifth aspect of the present disclosure, there is provided a method for transmitting data represented by a plurality of coded bits, the method comprising: separating the plurality of coded bits to form a first plurality of groups of coded bits, each of the first plurality of groups corresponding to a different level of significance determined by a coding scheme used to generate the plurality of coded bits and a type of a hybrid automatic repeat request (HARQ) scheme; allocating the first plurality of groups of coded bits to a second plurality of groups, each of the second plurality of groups corresponding to a different level of reliability determined by a mapping rule for a modulation scheme used to modulate the data; rearranging, for a retransmission of the coded bits, ones of the coded bits allocated to a first one of the second plurality of groups to a second one of the second plurality of groups, and ones of the coded bits allocated to the second one of the second plurality of groups to the first one or a third one of the second plurality of groups; and changing, for the retransmission, a sequence of coded bits allocated to each of the second plurality of groups after the rearranging.

According to a sixth aspect of the present disclosure, there is provided a transmitter for transmitting data represented by a plurality of coded bits, comprising: a bit allocation controller configured to separate the coded bits to form a first plurality of groups of coded bits, each of the first plurality of groups corresponding to a different level of significance determined by a coding scheme used to generate the plurality of coded bits and a type of a hybrid automatic repeat request (HARQ) scheme, and to allocate the first plurality of groups of coded bits to a second plurality of groups, each of the second plurality of groups corresponding to a different level of reliability determined by a mapping rule for a modulation scheme used to modulate the data; an intra-symbol interleaver configured to rearrange, for a retransmission of the coded bits, ones of the coded bits allocated to a first one of the second plurality of groups to a second one of the second plurality of groups, and ones of the coded bits allocated to the second one of the second plurality of groups to the first one or a third one of the second plurality of groups; and a plurality of inter-symbol interleavers each configured to change, for the retransmission, a sequence of coded bits allocated to one of the second plurality of groups.

According to a seventh aspect of the present disclosure, there is provided a method for transmitting data represented by a plurality of coded bits, the method comprising: allocating the plurality of coded bits to a plurality of groups, each of the plurality of groups corresponding to a different level of reliability determined by a mapping rule for a modulation scheme used to modulate the data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments, there is provided an interleaver for interleaving coded bits in a transmitter. For example, the transmitter may use a hybrid automatic repeat request (HARQ) scheme to improve throughput performance. Also for example, the transmitter may be used in an orthogonal frequency division multiplexing (OFDM) based communication system or a multi-input and multi-output (MIMO) system.

Figure 2:
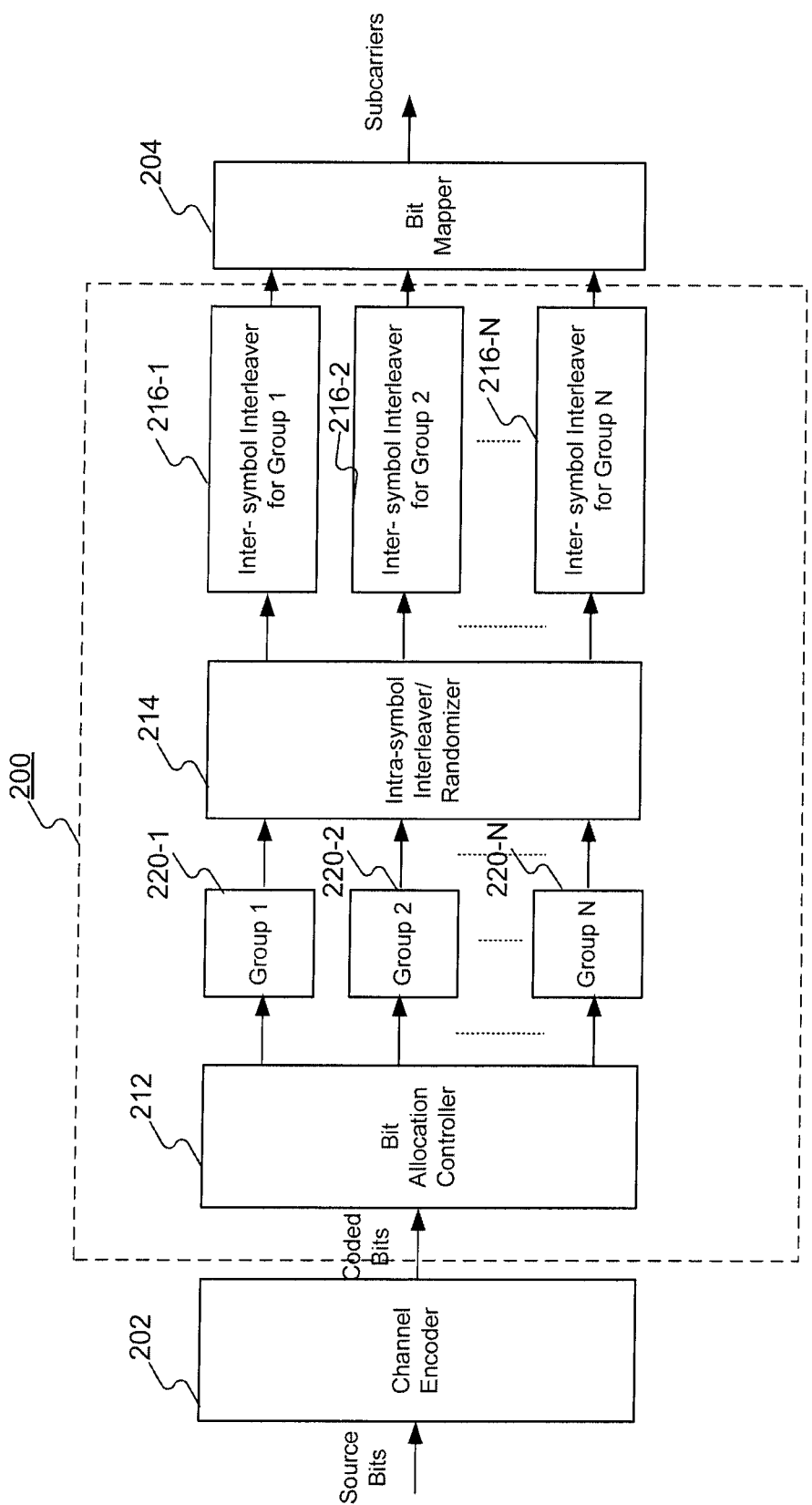
FIG. 2 illustrates a block diagram of an interleaver based on a hierarchical design, according to an exemplary embodiment.

FIG. 2 illustrates a block diagram of an interleaver 200 based on a hierarchical design, according to an exemplary embodiment. The interleaver 200 is coupled between a channel encoder 202 and a bit mapper 204, all of which may be a part of a transmitter. The interleaver 200 may include a bit allocation controller 212, an intra-symbol interleaver/randomizer 214, and a plurality of inter-symbol interleavers 216-1, 216-2, . . . , 216-N. The interleaver 200 may be implemented in hardware and/or software.

In exemplary embodiments, source bits, representing original data to be transmitted, are inputted to the channel encoder 202. The channel encoder 202 performs channel encoding of the source bits to generate coded bits, which may introduce redundant information that allows errors to be detected or corrected on a receiver side. For example, the channel encoder 202 may perform channel encoding using convolutional turbo codes (CTC). The channel encoder 202 further outputs the coded bits to the bit allocation controller 212.

In exemplary embodiments, the bit allocation controller 212 may allocate the coded bits to a plurality of groups such as N groups designated group 1 220-1, group 2 220-2, . . . , and group N 220-N, each of the coded bits being allocated to one of the N groups. The total number of groups N may be determined based on a modulation scheme used by the transmitter.

For example, a quadrature amplitude modulation (QAM) scheme, such as a 64-QAM scheme or a 16-QAM scheme, may be used by the transmitter. The QAM scheme modulates data by using first and second data signals to respectively modulate amplitudes of first and second components of a carrier, which are out of phase with each other by 90 degrees. The first data signal modulating the amplitude of the first component of the carrier may be referred to as a real part of the data signals, and the second data signal modulating the amplitude of the second component of the carrier may be referred to as an imaginary part of the data signals.

Based on the 64-QAM scheme, the bit mapper 204 may map six interleaved coded bits to a symbol, where the first three of the six coded bits correspond to the real part of the data signals and the remaining three of the six coded bits correspond to the imaginary part of the data signals. Because each of the real part and the imaginary part corresponds to three bits, the total number of groups N may be determined to be three, if the 64-QAM scheme is used by the transmitter.

Based on the 16-QAM scheme, the bit mapper 204 may map four interleaved coded bits to a symbol, where the first two of the four coded bits correspond to the real part of the data signals and the remaining two of the four coded bits correspond to the imaginary part of the data signals. Because each of the real part and the imaginary part corresponds to two bits, the total number of groups N may be determined to be two, if the 16-QAM scheme is used by the transmitter.

In one exemplary embodiment, the 64-QAM scheme is used by the transmitter. Accordingly, the total number of groups N is determined to be three, i.e., N=3. The bit allocation controller 212 allocates the coded bits outputted from the channel encoder 202 to three groups in sequence, e.g., group 1 220-1, group 2 220-2, and group 3 220-3, each of the coded bits allocated to one of the three groups.

In exemplary embodiments, group 1 220-1, group 2 220-2, and group 3 220-3 may be classified as groups each corresponding to a different level of reliability determined by a mapping rule for the 64-QAM scheme, and may be referred to herein as strong, middle, and weak groups, respectively. For example, group 1 220-1 may include coded bits that are each to be mapped to a most significant bit (MSB) by the bit mapper 204. Accordingly, when the 64-QAM scheme is used, group 1 220-1 may be classified as the strong group. Also for example, group 3 220-3 may include coded bits that are each to be mapped to a least significant bit (LSB) by the bit mapper 204. Accordingly, when the 64-QAM scheme is used, group 3 220-3 may be classified as the weak group. Group 2 220-2 may then be classified as the middle group.

In one exemplary embodiment, the 16-QAM scheme is used by the transmitter. Accordingly, the total number of groups N is determined to be two, i.e., N=2. The bit allocation controller 212 allocates the coded bits outputted from the channel encoder 202 to two groups in sequence, e.g., group 1 220-1 and group 2 220-2, each of the coded bits allocated to one of the two groups.

In exemplary embodiments, group 1 220-1 and group 2 220-2 may be classified as groups each corresponding to a different level of reliability determined by a mapping rule for the 16-QAM scheme, and may be referred to herein as strong and weak groups, respectively. For example, group 1 220-1 may include coded bits that are each to be mapped to a most significant bit (MSB) by the bit mapper 204. Accordingly, when the 16-QAM scheme is used, group 1 220-1 may be classified as the strong group. Also for example, group 2 220-2 may include coded bits that are each to be mapped to a least significant bit (LSB) by the bit mapper 204. Accordingly, when the 16-QAM scheme is used, group 2 220-2 may be classified as the weak group.

In exemplary embodiments, during a retransmission of the coded bits, the bit allocation controller 212 may allocate the coded bits to the N groups group 1 220-1, group 2 220-2, . . . , and group N 220-N, which are further inputted to the intra-symbol interleaver/randomizer 214. The intra-symbol interleaver/randomizer 214 may perform intra-symbol interleaving of the coded bits. For example, if the 64-QAM scheme is used and strong, middle, and weak groups of coded bits are inputted to the intra-symbol interleaver/randomizer 214, the intra-symbol interleaver/randomizer 214 may rearrange ones of the coded bits in the strong group into the middle group or the weak group, and rearrange ones of the coded bits in the middle group or the weak group to the strong group. Also for example, if the 16-QAM scheme is used and strong and weak groups of coded bits are inputted to the intra-symbol interleaver/randomizer 214, the intra-symbol interleaver/randomizer 214 may rearrange ones of the coded bits in the strong group to the weak group, and rearrange ones of the coded bits in the weak group into the strong group.

In exemplary embodiments, the intra-symbol interleaver/randomizer 214 outputs the N groups of coded bits to the inter-symbol interleavers 216-1, 216-2, . . . , 216-N after performing the intra-symbol interleaving described above. The inter-symbol interleavers 216-1, 216-2, . . . , 216-N may further perform inter-symbol interleaving of the N groups of coded bits, respectively. For example, the inter-symbol interleaver 216-1 may further change a sequence of the coded bits in group 1 220-1. Also for example, the inter-symbol interleaver 216-N may further change a sequence of the coded bits in group N 220-N. In the illustrated embodiment, the inter-symbol interleavers 216-1, 216-2, . . . , 216-N perform interleaving of the N groups of coded bits, respectively. Alternatively, a single inter-symbol interleaver may be used to perform interleaving for each of the N groups of coded bits.

In exemplary embodiments, the N groups of coded bits, after being intra-symbol interleaved and inter-symbol interleaved, are inputted to the mapper 204 for mapping to symbols. For example, the mapper 204 may use the mapping rule for the 64-QAM scheme. Also for example, the mapper 204 may use the mapping rule for the 16-QAM scheme. Based on the mapping rule, the coded bits corresponding to even numbered positions in each of the N groups may be mapped to the real part of the symbols, and the coded bits corresponding to odd numbered positions in each of the N groups may be mapped to the imaginary part of the symbols. The symbols may then be sent to subcarriers (not shown) for modulation.

Figure 3:
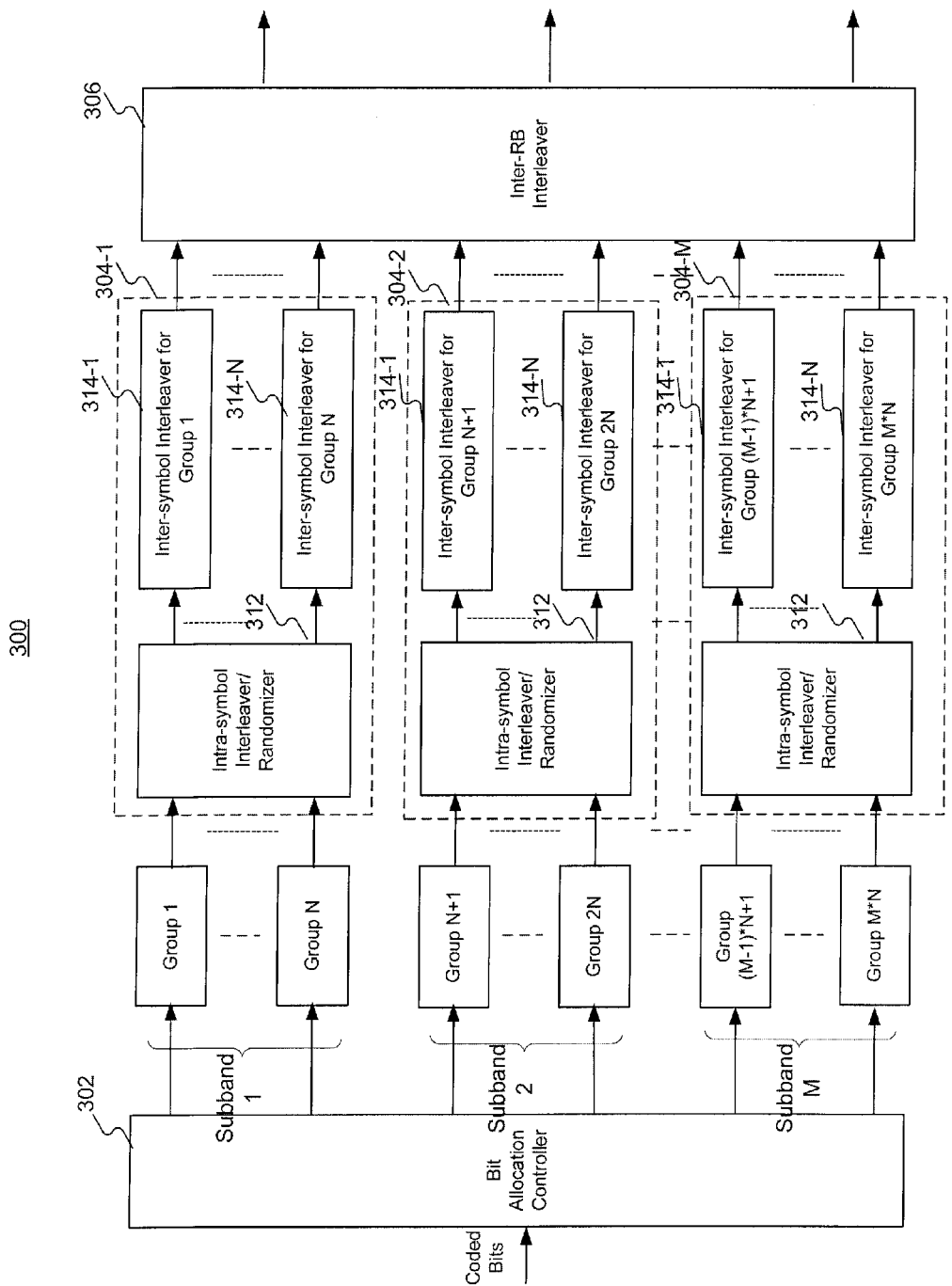
FIG. 3 illustrates a block diagram of an interleaver based on a hierarchical design for a closed-loop (CL) communication system, according to an exemplary embodiment.

FIG. 3 illustrates a block diagram of an interleaver 300 based on a hierarchical design for a closed-loop (CL) communication system, according to an exemplary embodiment. The interleaver 300 may be used in a communication system that performs channel quality information (CQI) feedback based on resource blocks (RBs), and may be implemented in hardware and/or software. For example, the interleaver 300 may be a part of a transmitter. Also for example, the interleaver 300 may perform interleaving of coded bits corresponding to a plurality of resource blocks. A resource block may include consecutive OFDM symbols in a time domain and consecutive subcarriers in a frequency domain, and may be used for channel estimation.

In exemplary embodiments, the interleaver 300 may include a bit allocation controller 302, a plurality of subband interleavers 304-1, 304-2, . . . , 304-M (M is a total number of subbands), and an inter-resource-block (inter-RB) interleaver 306. The subband interleaver 304-$i$ ($i$=1, 2, . . . , M) further includes an intra-symbol interleaver/randomizer 312 and a plurality of inter-symbol interleavers 314-1, 314-2, . . . , 314-N. For example, the intra-symbol interleaver/randomizer 312 and the plurality of inter-symbol interleavers 314-1, . . . , 314-N are substantially the same as the intra-symbol interleaver/randomizer 214 and the plurality of inter-symbol interleavers 216-1, ..., 216-N shown in FIG. 2, respectively.

In exemplary embodiments. the coded bits corresponding to the plurality of resource blocks are inputted to the bit allocation controller 302. The bit allocation controller 302 may allocate the coded bits to a plurality of subbands, e.g., subband 1, subband 2, ..., subband M, each including a plurality of groups, e.g., N groups. Each of the N groups corresponds to a different level of reliability determined by a mapping rule for a modulation scheme used by the transmitter, as explained above. As a result, the bit allocation controller 302 may allocate the coded bits to M*N groups, group 1, group 2, ..., group M*N. During a retransmission of the coded bits, the subband interleavers 304-1, 304-2, ..., 304-M may perform interleaving of coded bits allocated to subband 1, subband 2, ..., subband M, respectively, each similar to the interleaving described above by the intra-symbol interleaver/randomizer 214 and the plurality of inter-symbol interleavers 216-1, 216-2, ..., 216-N (FIG. 2).

In exemplary embodiments, the inter-RB interleaver 306 receives interleaved coded bits from each of the subband interleavers 304-1, 304-2, ..., 304-M. The inter-RB interleaver 306 may further change, during the retransmission, a sequence of ones of the coded bits corresponding to a first one of the plurality of resource blocks and ones of the coded bits corresponding to a second one of the plurality of resource blocks, based on, e.g., a carrier to interference-plus-noise ratio (CINR) for each of the first and second ones of the plurality of resource blocks. Interleaved coded bits are then outputted by the inter-RB interleaver 306 for bit mapping.

Figure 1:
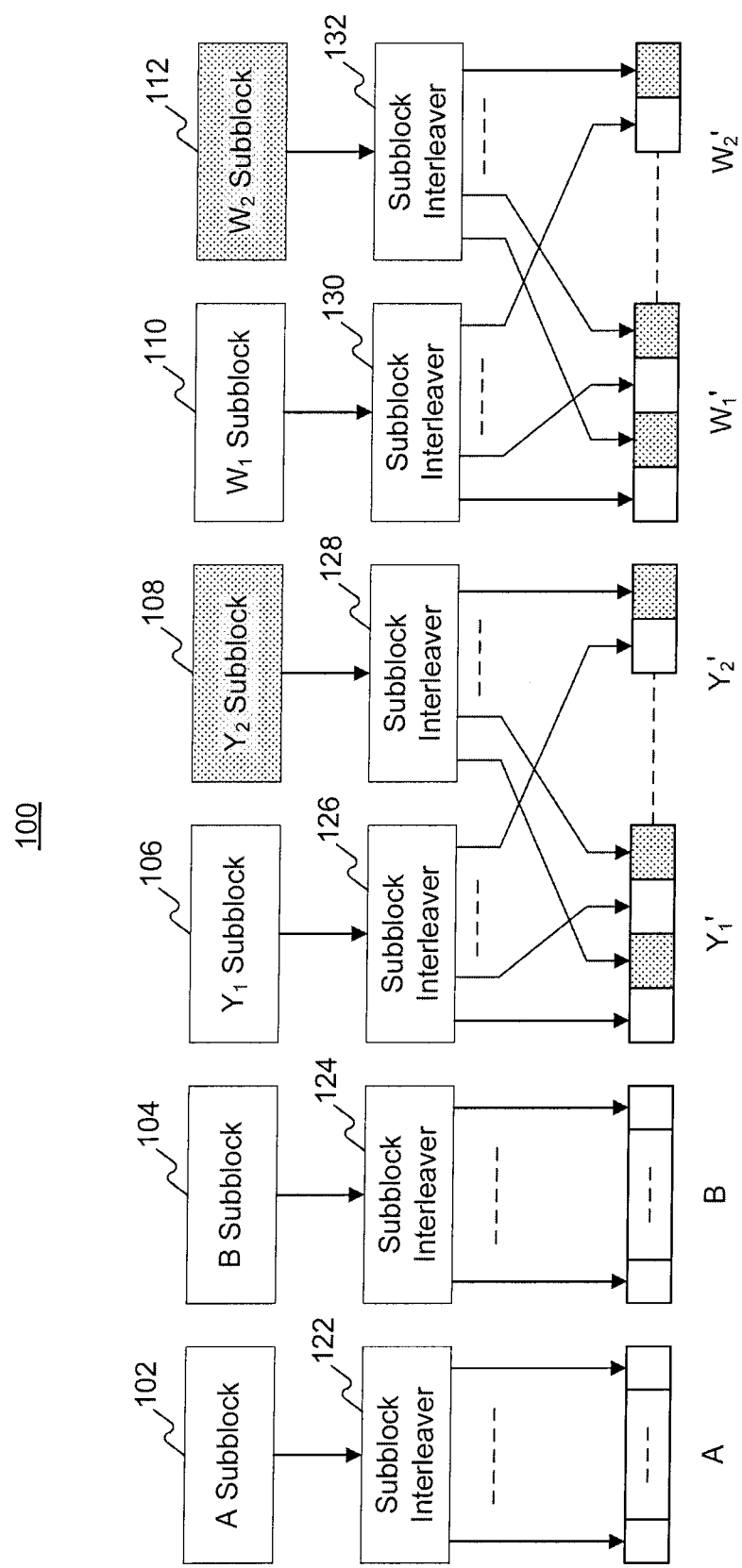
FIG. 1 illustrates a conventional subblock interleaving method, according to IEEE standard 802.16e.
Figure 4A:
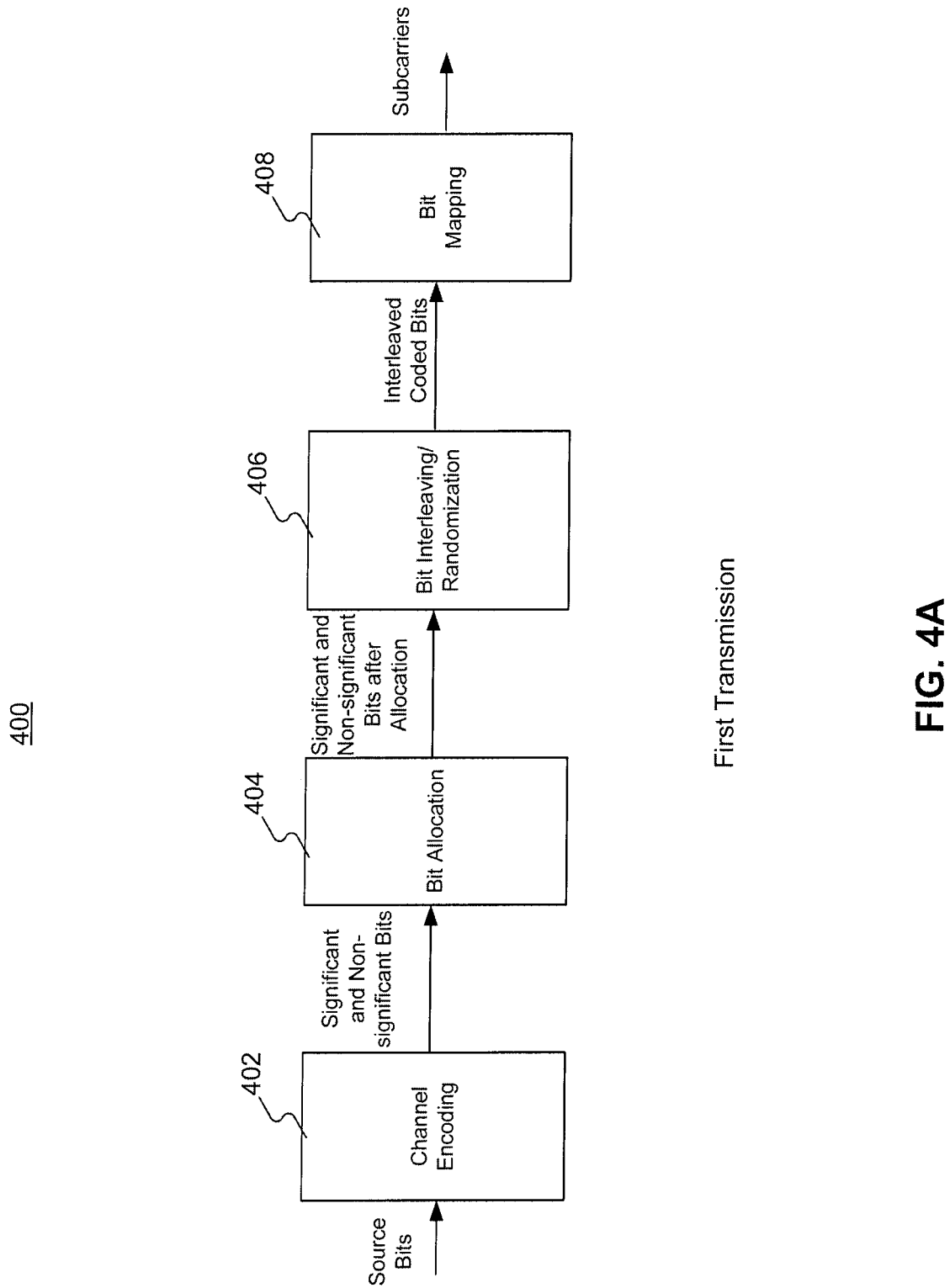
FIGS. 4A and 4B illustrate a bit allocation and interleaving method, according to an exemplary embodiment.
Figure 4B:
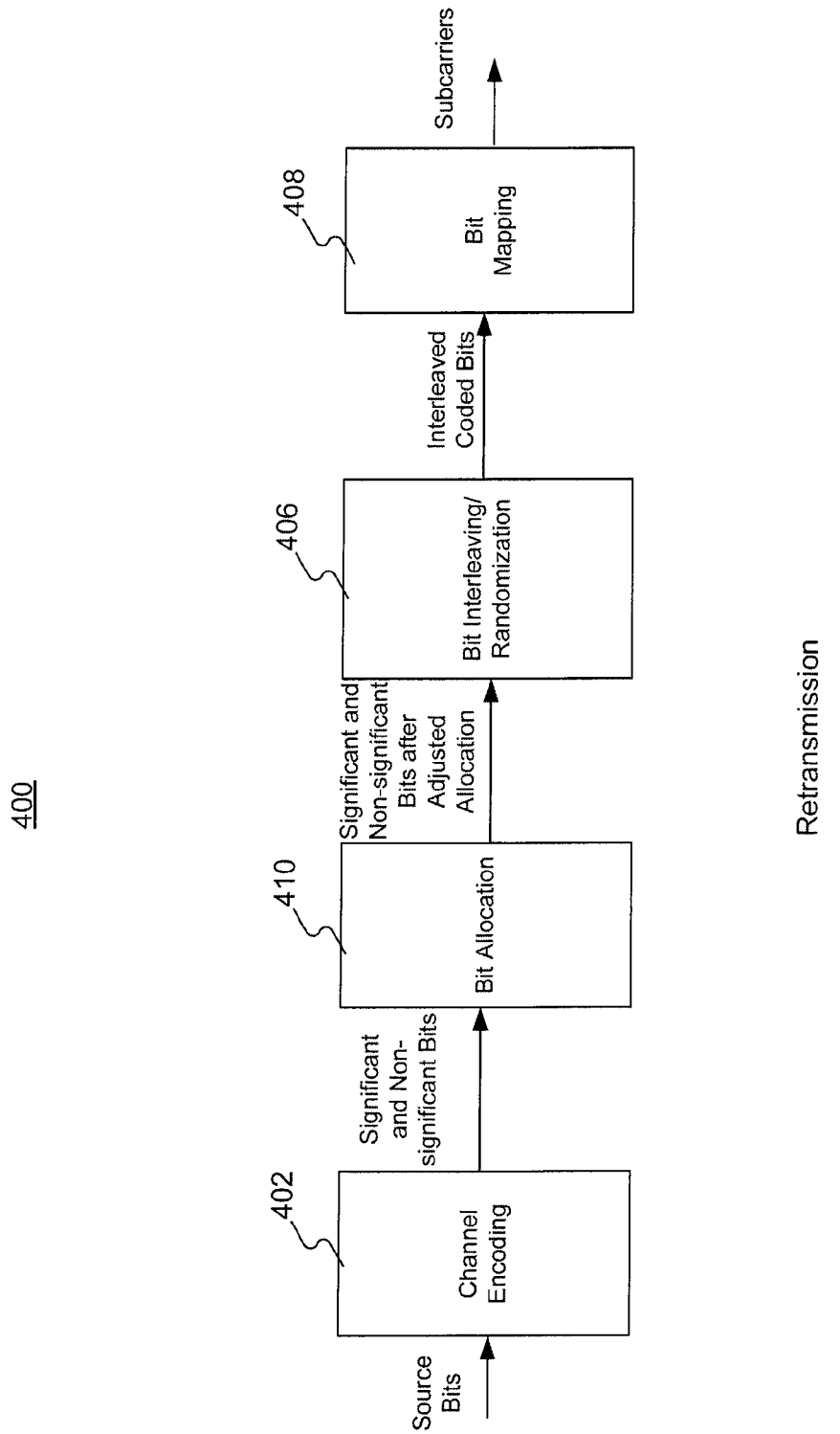

FIGS. 4A and 4B illustrate a bit allocation and interleaving method 400, according to an exemplary embodiment. Referring to FIG. 4A, when source bits representing original data are transmitted during a first transmission, channel encoding 402 is performed on the source bits based on a coding scheme to generate coded bits, which may have different levels of significance determined by the coding scheme and a type of the HARQ scheme, such as a type-I HARQ scheme or a type-II HARQ scheme. For example, for channel encoding based on convolutional turbo codes (CTC), the coded bits may include systematic bits, such as the bits included in the data subblocks A and B illustrated in FIG. 1, and parity bits, such as the bits included in the data subblocks Y1', Y2', W1', and W2' illustrated in FIG. 1. Typically, the systematic bits may have a relatively higher level of significance than the parity bits based on the type-I HARQ scheme. For the type-II HARQ scheme, the parity bits to be transmitted during a retransmission may have a relatively higher level of significance than the systematic bits transmitted during a previous transmission, which may have a relatively higher level of significance than the parity bits transmitted during the previous transmission.

In exemplary embodiments, bit allocation 404 may be performed on the coded bits. During bit allocation 404, the coded bits may be separated to form a plurality of groups of coded bits, each of the plurality of groups corresponding to a different level of significance determined by the coding scheme and the type of the HARQ scheme. For example, the coded bits may be separated to form first and second groups of coded bits, the first group of coded bits having a relatively high level of significance, referred to herein as significant bits, and the second group of coded bits having a relatively low level of significance, referred to herein as non-significant bits.

In addition, during bit allocation 404, the significant and non-significant bits are allocated to a plurality of groups each having a different level of reliability determined by a mapping rule for a modulation scheme used to modulate the data, as described above. For example, as many of the significant bits as possible may be allocated to the groups that correspond to a relatively high level of reliability, such as the strong group noted above. Also for example, as many of the non-significant bits as possible may be allocated to the groups that correspond to a relatively low level of reliability, such as the weak group noted above.

Alternatively, during the first transmission, the coded bits may not be separated to form a plurality of groups of coded bits, wherein each of the plurality of groups corresponds to a different level of significance determined by the coding scheme and the type of the HARQ scheme. Instead, during bit allocation 404, the coded bits may be directly allocated to a plurality of groups each having a different level of reliability determined by the mapping rule.

In exemplary embodiments, bit interleaving/randomization, similar to the above-described interleaving performed by the plurality of inter-symbol interleavers 216-1, 216-2, ..., 216-N (FIG. 2), may or may not further be performed to generate interleaved code bits for each of the groups each having a different level of reliability (406). The interleaved coded bits may then be used for mapping to symbols (408).

Referring to FIG. 4B, when the source bits are transmitted during a retransmission, channel encoding 402 is performed on the source bits to generate the coded bits. During bit allocation 410, the coded bits are separated to form the plurality of groups of coded bits, each of the plurality of groups corresponding to a different level of significance determined by the coding scheme and the type of the HARQ scheme, such as the significant and non-significant bits.

In addition, during bit allocation 410, allocation of the significant and non-significant bits are adjusted, compared to bit allocation 404 (FIG. 4A) during the first transmission. For example, ones of the significant bits that are allocated to the groups that correspond to a relatively high level of reliability, such as the strong group, during the first transmission may be allocated to the groups that correspond to a relatively low level of reliability, such as the weak group, during the retransmission. Also for example, ones of the non-significant bits that are allocated to the groups that correspond to a relatively low level of reliability, such as the weak group, during the first transmission may be allocated to the groups that correspond to a relatively high level of reliability, such as the strong group, during the retransmission. The significant and non-significant bits after the adjusted allocation may or may not be used for the interleaving (406) before the mapping (408).

Alternatively, during the retransmission, the coded bits may not be separated to form a plurality of groups of coded bits, wherein each of the plurality of groups corresponds to a different level of significance determined by the coding scheme and the type of the HARQ scheme. Instead, during bit allocation 410, the coded bits may be directly allocated to a plurality of groups each having a different level of reliability determined by the mapping rule. The coded bits may or may not further be used for the interleaving (406) before the mapping (408).

Figure 5A:
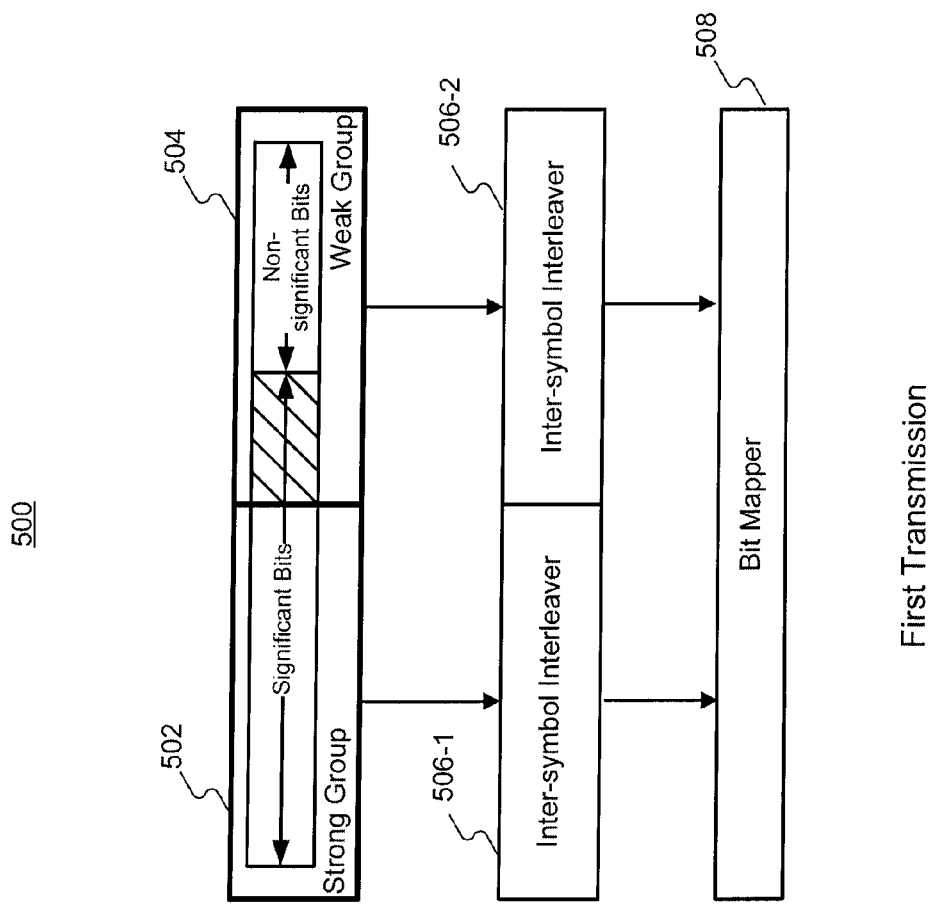
FIGS. 5A and 5B illustrate a bit allocation and interleaving example, according to an exemplary embodiment.
Figure 5B:
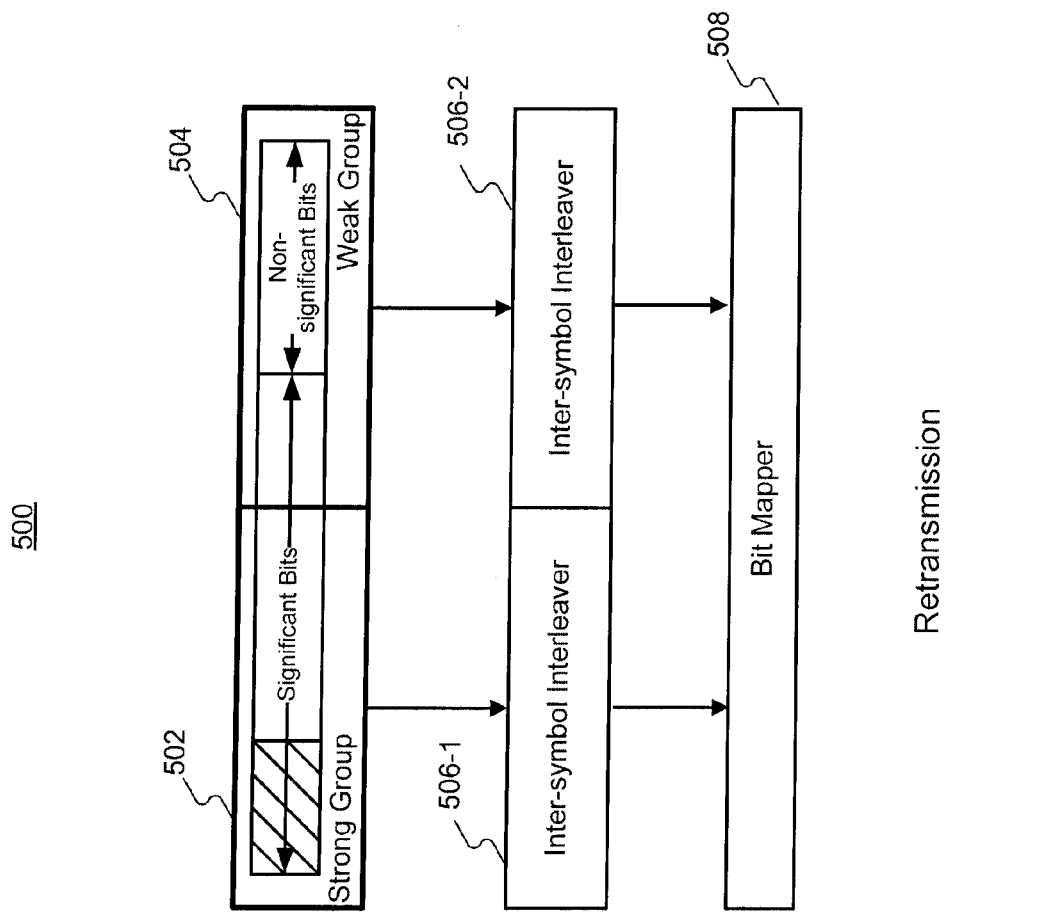

FIGS. 5A and 5B illustrate a bit allocation and interleaving example 500 based on the bit allocation and interleaving method 400 (FIG. 4), according to an exemplary embodiment. For example, coded bits including significant bits and non-significant bits may be generated after channel encoding. For illustrative purposes only, it is assumed that a 16-QAM, rate 3/4 scheme provided in IEEE standard 802.16e is used for data modulation. Accordingly, the significant bits and the non-significant bits may be allocated to first and second groups each corresponding to a different level of reliability determined by the mapping rule for the 16-QAM scheme, such as a strong group 502 and a weak group 504.

In one exemplary embodiment, shown in FIG. 5A, a length of each of the strong group 502 and the weak group 504 is smaller than a length of the significant bits, but is larger than a length of the non-significant bits. Therefore, during a first transmission, ones of the significant bits may be allocated to the strong group 502, and remaining ones of the significant bits, represented by the hatched area in FIG. 5A, may be allocated to the weak group 504. In addition, all of the non-significant bits may be allocated to the weak group 504. First and second inter-symbol interleavers 506-1 and 506-2 may then receive the allocated significant and non-significant bits, and perform interleaving of coded bits allocated to the strong group 502 and the weak group 504, respectively. Interleaved coded bits are further inputted to a bit mapper 508 for bit mapping.

During a retransmission of the coded bits including the significant bits and the non-significant bits, shown in FIG. 5B, the ones of the significant bits that are allocated to the weak group 504 during the first transmission may be allocated to the strong group 502, represented by the hatched area in FIG. 5B, and ones of the significant bits that are allocated to the strong group 502 during the first transmission may be allocated to the weak group 504. In addition, all of the non-significant bits may be allocated to the weak group 504 during the retransmission. In one exemplary embodiment, allocation of the significant bits for the retransmission may be achieved by performing a circular shift of the significant bits allocated for the first transmission. The first and second inter-symbol interleavers 506-1 and 506-2 may then perform bit interleaving for coded bits allocated to the strong group 502 and the weak group 504, respectively, to generate interleaved coded bits. The interleaved coded bits are further inputted to the bit mapper 508 for bit mapping.

Figure 6A:
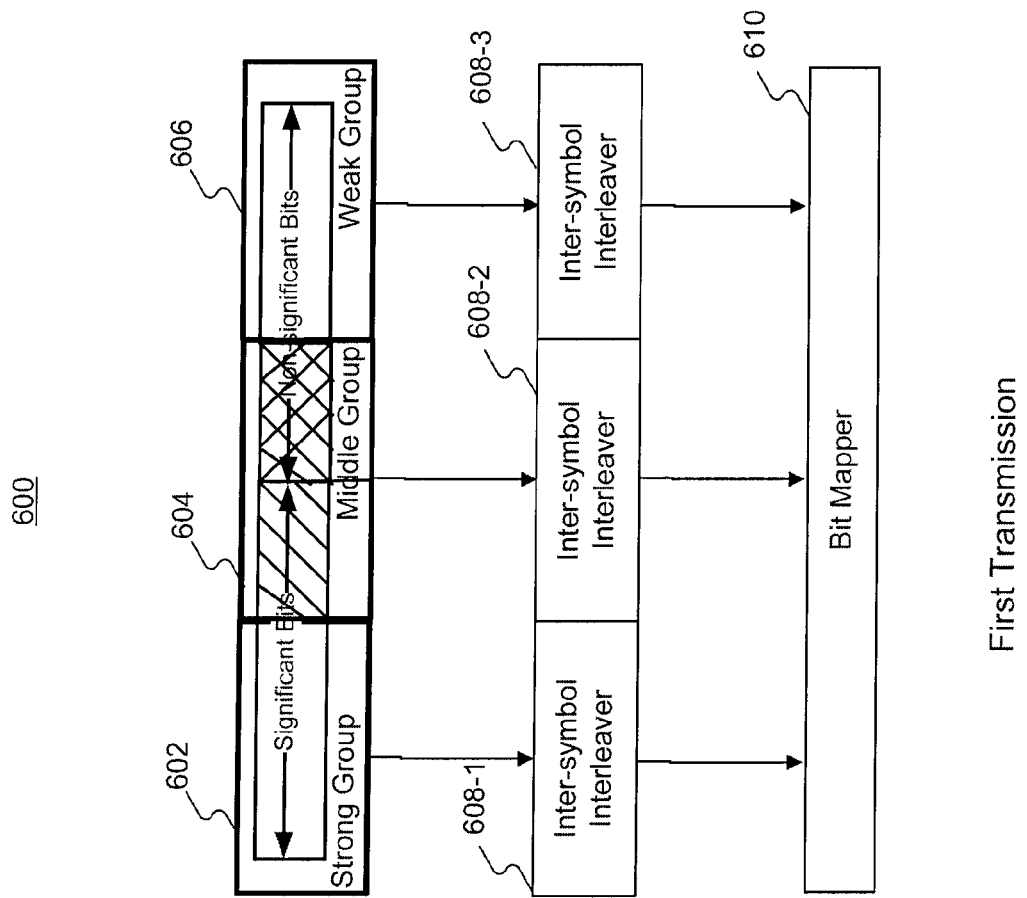
FIGS. 6A and 6B illustrate a bit allocation and interleaving example, according to an exemplary embodiment.
Figure 6B:
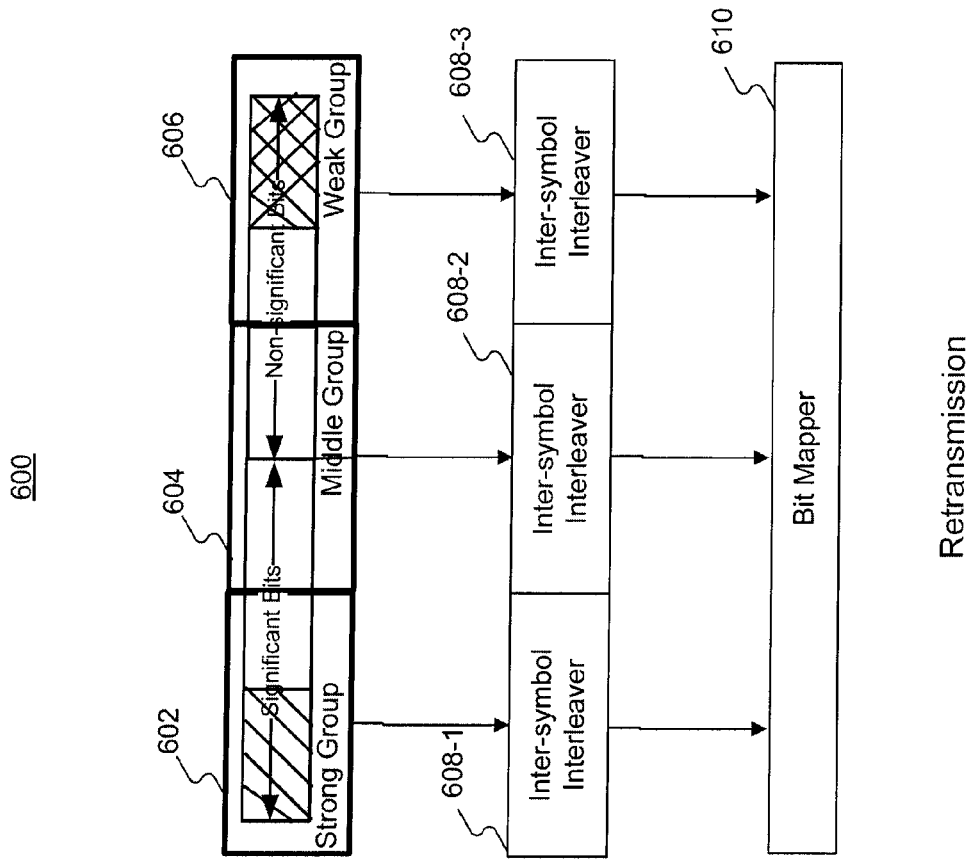

FIGS. 6A and 6B illustrate a bit allocation and interleaving example 600 based on the bit allocation and interleaving method 400 (FIG. 4), according to an exemplary embodiment. For example, coded bits including significant bits and non-significant bits may be generated after channel encoding. For illustrative purposes only, it is assumed that a 64-QAM, rate ½ scheme provided in IEEE standard 802.16e is used for data modulation. Accordingly, the significant bits and the non-significant bits may be allocated to first, second, and third groups each corresponding to a different level of reliability determined by the mapping rule for the 64-QAM scheme, such as a strong group 602, a middle group 604, and a weak group 606.

In one exemplary embodiment, shown in FIG. 6A, a length of each of the strong group 602, the middle group 604, and the weak group 606 is smaller than a length of the significant bits, and is also smaller than a length of the non-significant bits. Therefore, during a first transmission, ones of the significant bits may be allocated to the strong group 602, and remaining ones of the significant bits, represented by the hatched area in FIG. 6A, may be allocated to the middle group 604. Similarly, ones of the non-significant bits may be allocated to the weak group 606, and remaining ones of the non-significant bits, represented by the cross-hatched area in FIG. 6A, may be allocated to the middle group 604. First, second, and third inter-symbol interleavers 608-1, 608-2, 608-3 may then receive the allocated significant and non-significant bits, and perform interleaving of coded bits allocated to the strong group 602, the middle group 604, and the weak group 606, respectively. Interleaved coded bits are further inputted to a bit mapper 610 for bit mapping.

During a retransmission of the coded bits including the significant bits and the non-significant bits, shown in FIG. 6B, the ones of the significant bits that are allocated to the middle group 604 during the first transmission may be allocated to the strong group 602, represented by the hatched area in FIG. 6B, and ones of the significant bits that are allocated to the strong group 602 during the first transmission may be allocated to the middle group 604. Similarly, the ones of the non-significant bits that are allocated to the middle group 604 during the first transmission may be allocated to the weak group 606, represented by the cross-hatched area in FIG. 6B, and ones of the non-significant bits that are allocated to the weak group 606 during the first transmission may be allocated to the middle group 604. For example, allocation of the significant bits during the retransmission may be achieved by performing a circular shift of the significant bits allocated for the first transmission. Also for example, allocation of the non-significant bits during the retransmission may be achieved by performing a circular shift of the non-significant bits allocated for the first transmission. The first, second, and third inter-symbol interleavers 608-1, 608-2, and 608-3 may then perform bit interleaving for coded bits allocated to the strong group 602, the middle group 604, and the weak group 606, respectively, to generate interleaved coded bits. The interleaved coded bits are further inputted to the bit mapper 610 for bit mapping.

Figure 7A:
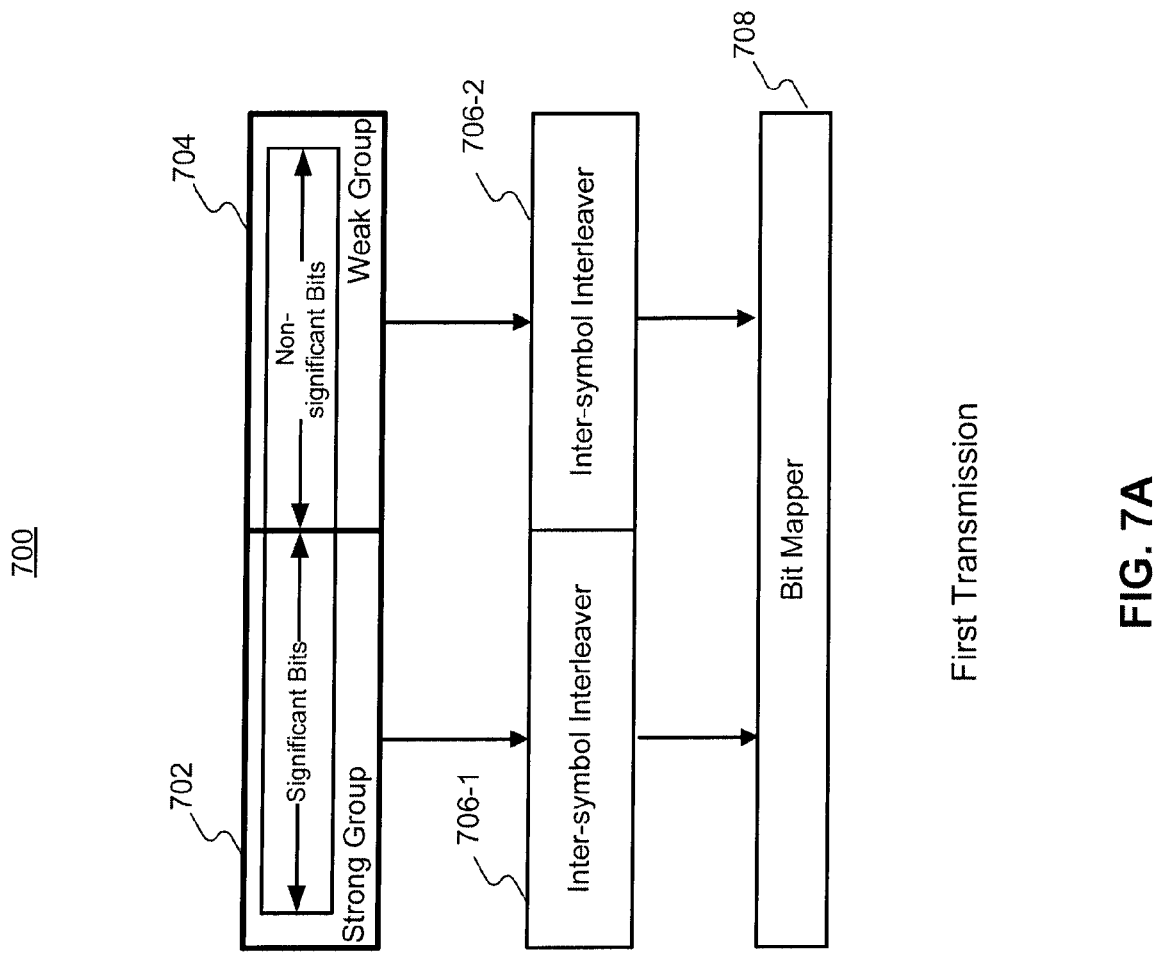
FIGS. 7A and 7B illustrate a bit allocation and interleaving example, according to an exemplary embodiment.
Figure 7B:
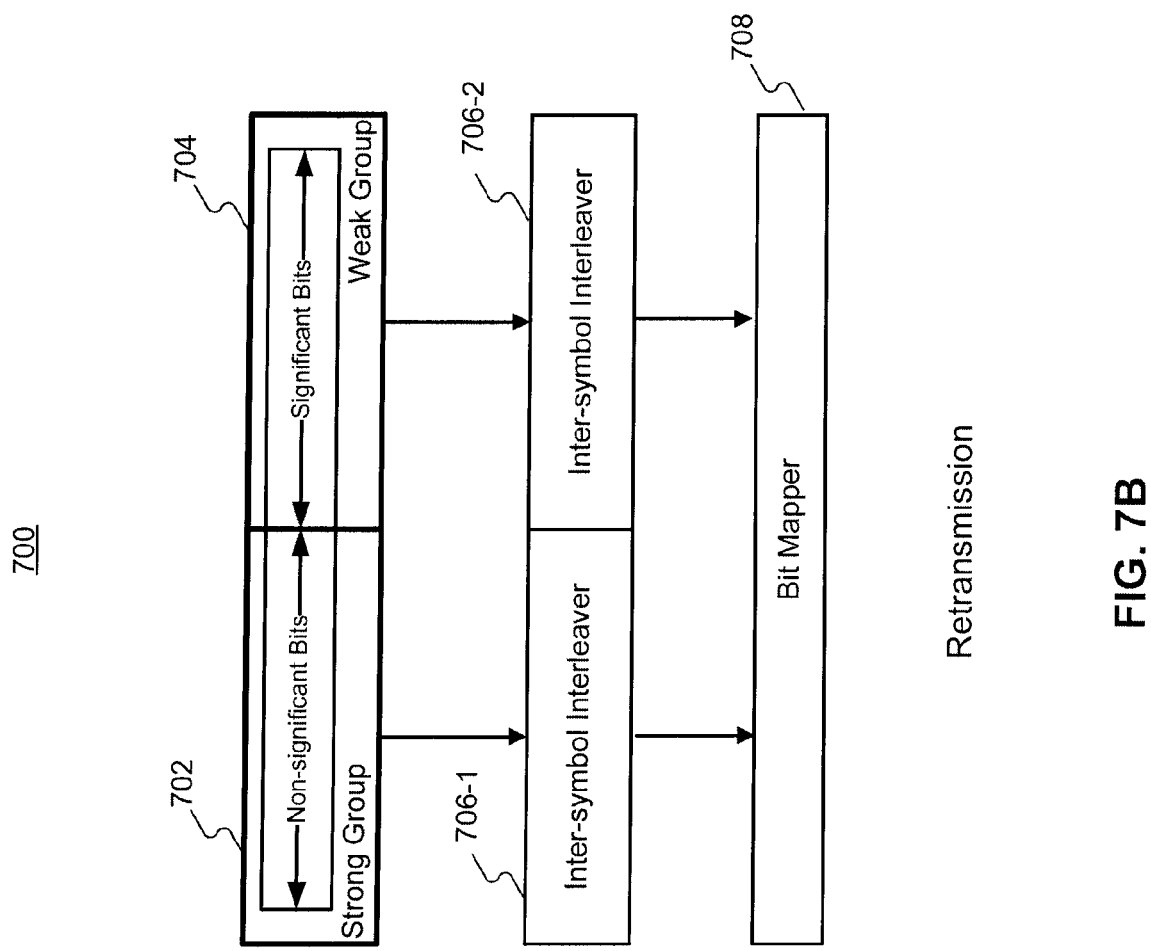

FIGS. 7A and 7B illustrate a bit allocation and interleaving example 700 based on the bit allocation and interleaving method 400 (FIG. 4), according to an exemplary embodiment. For example, coded bits including significant bits and non-significant bits may be generated after channel encoding. For illustrative purposes only, it is assumed that a 16-QAM, rate 1/2 scheme provided in IEEE standard 802.16e is used for data modulation. Accordingly, the significant bits and the non-significant bits may be allocated to first and second groups each corresponding to a different level of reliability determined by the mapping rule for the 16-QAM scheme, such as a strong group 702 and a weak group 704.

In one exemplary embodiment, shown in FIG. 7A, a length of each of the strong group 702 and the weak group 704 is equal to a length of the significant bits, and is also equal to a length of the non-significant bits. Therefore, during a first transmission, the significant bits may be allocated to the strong group 702, and the non-significant bits may be allocated to the weak group 704. First and second inter-symbol interleavers 706-1 and 706-2 may then receive the allocated significant and non-significant bits, and perform interleaving of coded bits allocated to the strong group 702 and the weak group 704, respectively, to generate interleaved coded bits. The interleaved coded bits are further inputted to a bit mapper 708 for bit mapping.

During a retransmission of the coded bits including the significant bits and the non-significant bits, shown in FIG. 7B, the significant bits that are allocated to the strong group 702 during the first transmission may be allocated to the weak group 704. In addition, the non-significant bits that are allocated to the weak group 704 during the first transmission may be allocated to the strong group 702. In one exemplary embodiment, allocation of the significant and non-significant bits during the retransmission may be achieved by performing a circular shift of the significant and non-significant bits allocated for the first transmission. The first and second inter-symbol interleavers 706-1 and 706-2 may then perform bit interleaving for coded bits allocated to the strong group 702 and the weak group 704, respectively, to generate interleaved coded bits. The interleaved coded bits are further inputted to the bit mapper 708 for bit mapping.

In exemplary embodiments, the interleaver 200 (FIG. 2) may be used in a single-input and single-output (SISO) communication system, where data is transmitted by a single transmitting antenna. As noted above, allocation of significant and non-significant bits during a retransmission may be achieved by performing a circular shift of the significant and/or non-significant bits allocated for the first transmission. When the interleaver 200 is used in a SISO communication system, an additional circular shift may be performed to further achieve a diversity gain. For example, the intra-symbol interleaver 214 (FIG. 2) may perform the additional circular shift.

Figure 8A:
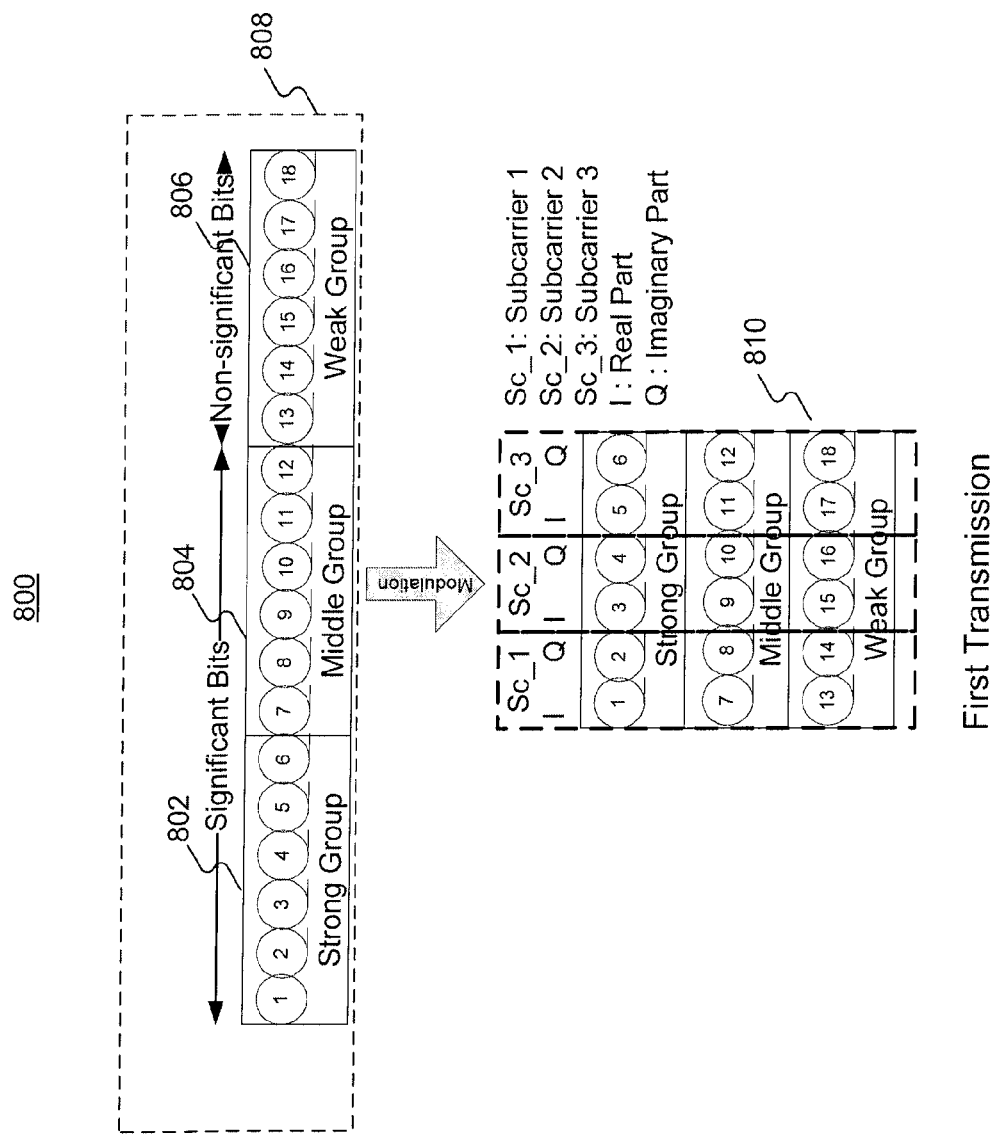
FIGS. 8A and 8B illustrate a bit allocation and interleaving method for use in a single-input and single-output (SISO) communication system, according to an exemplary embodiment.
Figure 8B:
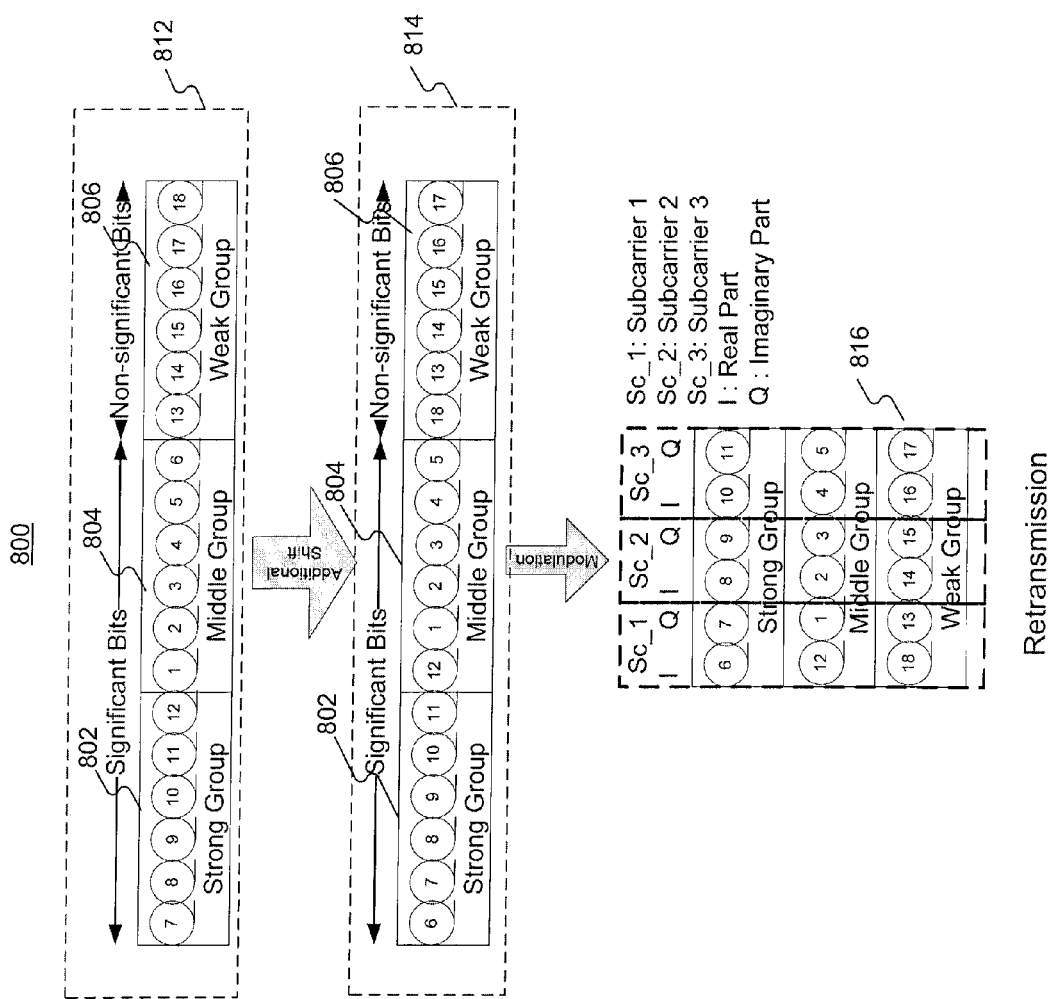

FIGS. 8A and 8B illustrate a bit allocation and interleaving method 800 for use in a SISO communication system, according to an exemplary embodiment. For illustrative purposes only, it is assumed that 18 coded bits, i.e., bit 1, bit 2, ..., bit 18, each represented by a small circle in FIGS. 8A and 8B, are to be allocated and interleaved during a first transmission and a retransmission. It is further assumed that bit 1, bit 2, ..., bit 12 are significant bits and bit 13, bit 14, ..., bit 18 are non-significant bits.

In one exemplary embodiment, shown in FIG. 8A, the significant bits, i.e., bit 1, bit 2, ..., bit 12, are allocated to a strong group 802 and a middle group 804, and the non-significant bits, i.e., bit 13, bit 14, ..., bit 18, are allocated to a weak group 806, to form a group allocation 808 during the first transmission. For example, bit 1, bit 2, ..., bit 6 may be allocated to the strong group 802, and bit 7, bit 8, ..., bit 12 may be allocated to the middle group 804.

The group allocation 808 may result in a subcarrier allocation 810 for the first transmission. For example, bit 1, bit 2, bit 7, bit 8, bit 13, and bit 14 may be allocated to a first subcarrier (subcarrier 1), bit 3, bit 4, bit 9, bit 10, bit 15, and bit 15 may be allocated to a second subcarrier (subcarrier 2), and bit 5, bit 6, bit 11, bit 12, bit 17, and bit 18 may be allocated to a third subcarrier (subcarrier 3).

During the retransmission, shown in FIG. 8B, a circular shift may be performed on the significant bits, i.e., bit 1, bit 2, ..., bit 12, similar to the circular shift described above in, e.g., FIG. 6B, which results in a group allocation 812. In the group allocation 812, ones of the significant bits that are allocated to the strong group 802 during the first transmission, i.e., bit 1, bit 2, ..., bit 6, are allocated to the middle group 804, and ones of the significant bits that are allocated to the middle group 804 during the first transmission, i.e., bit 7, bit 8, ..., bit 12, are allocated to the strong group 802.

In exemplary embodiments, an additional circular shift may be performed on the significant bits and the non-significant bits to further achieve a diversity gain, which may result in a group allocation 814. For a SISO system with a single transmitting antenna, a length of bit shift for the addition circular shift may be one. In the illustrated embodiment, after the additional circular shift, bit 6, bit 7, ..., bit 11 are allocated to the strong group 802, bit 12, bit 1, ..., bit 5 are allocated to the middle group 804, and bit 18, bit 13, ..., bit 17 are allocated to the middle group 806.

The group allocation 814 may result in a subcarrier allocation 816 for the retransmission. For example, bit 6, bit 7, bit 12, bit 1, bit 18, and bit 13 may be allocated to the first subcarrier (subcarrier 1), bit 8, bit 9, bit 2, bit 3, bit 14, and bit 15 may be allocated to the second subcarrier (subcarrier 2), and the coded bits bit 10, bit 11, bit 4, bit 5, bit 16, and bit 17 may be allocated to the third subcarrier (subcarrier 3). Compared with the subcarrier allocation 810 (FIG. 8A) for the first transmission, the subcarrier allocation 816 achieves a diversity gain for the retransmission.

In exemplary embodiments, the interleaver 200 (FIG. 2) may be used in a multi-input and multi-output (MIMO) communication system, where data is transmitted by multiple transmitting antennas. As noted above, allocation of significant and non-significant bits during a retransmission may be achieved by performing a circular shift of the significant and/or non-significant bits allocated for the first transmission. When the interleaver 200 is used in a MIMO communication system, an additional circular shift may be performed to further achieve a diversity gain. For example, the intra-symbol interleaver 214 (FIG. 2) may perform the additional circular shift.

Figure 9A:
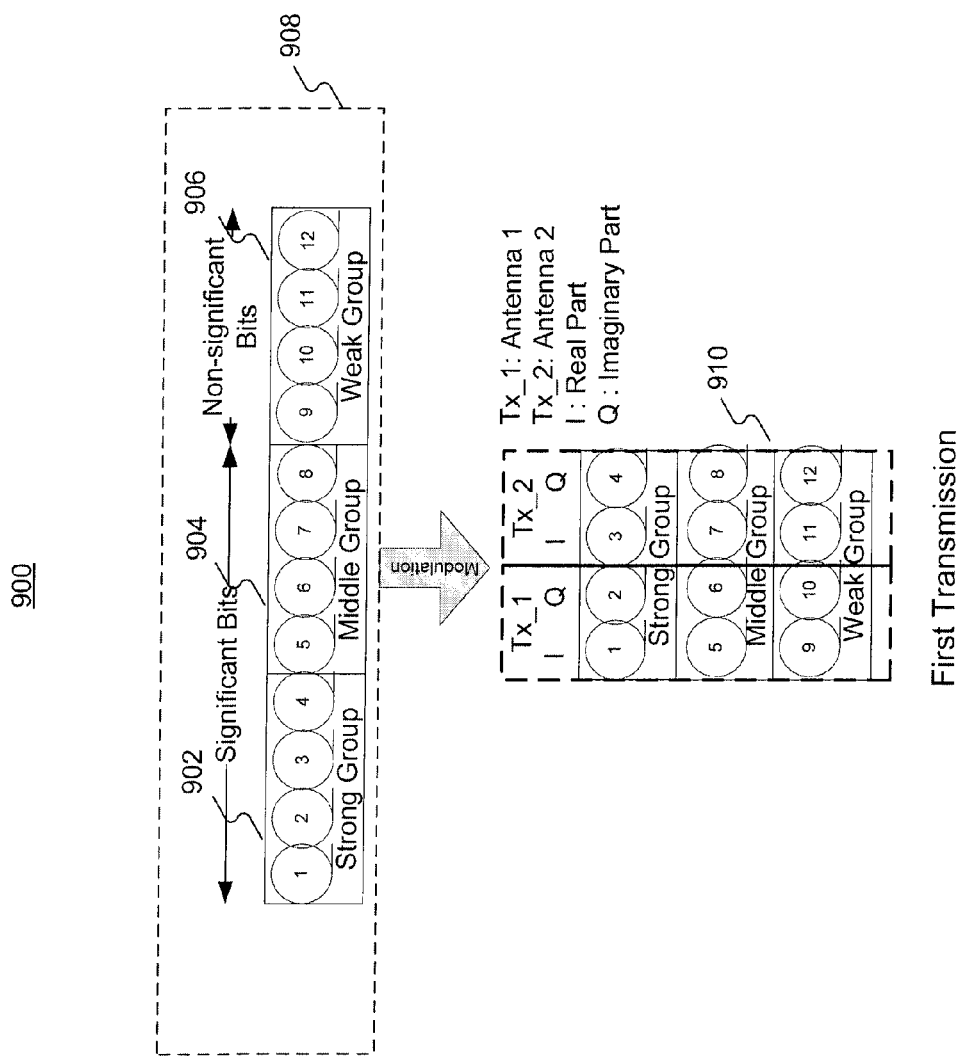
FIGS. 9A and 9B illustrate a bit allocation and interleaving method for use in a multi-input and multi-output (MIMO) communication system, according to an exemplary embodiment.
Figure 9B:
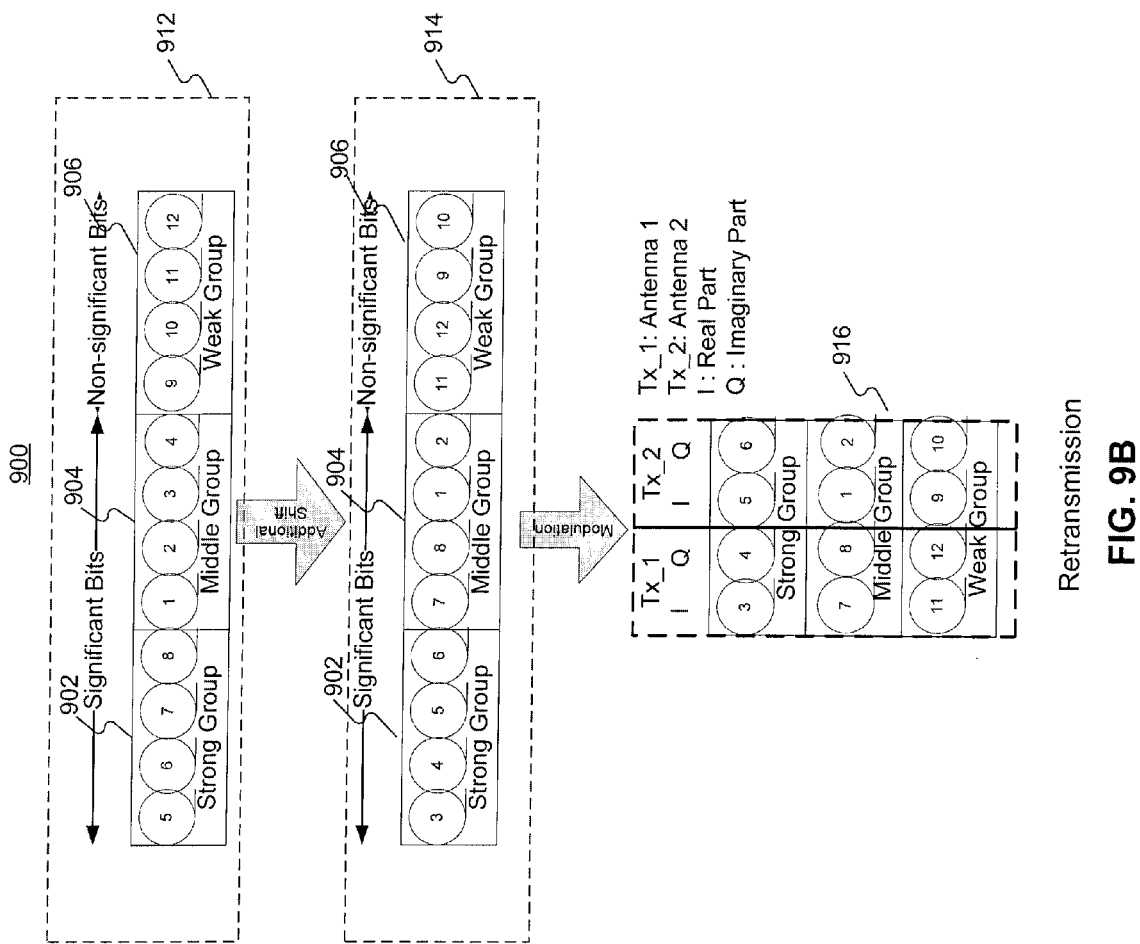

FIGS. 9A and 9B illustrate a bit allocation and interleaving method 900 for use in a MIMO communication system, according to an exemplary embodiment. For illustrative purposes only, it is assumed that 12 coded bits, i.e., bit 1, bit 2, ..., bit 12, each represented by a small circle in FIGS. 9A and 9B, are to be allocated and interleaved during a first transmission and a retransmission. It is further assumed that bit 1, bit 2, ..., bit 8 are significant bits and bit 9, bit 10, ..., bit 12 are non-significant bits.

In one exemplary embodiment, shown in FIG. 9A, the significant bits, i.e., bit 1, bit 2, ..., bit 8, are allocated to a strong group 902 and a middle group 904, and the non-significant bits, i.e., bit 9, bit 10, ..., bit 12, are allocated to a weak group 906, to form a group allocation 908 during the first transmission. For example, bit 1, bit 2, ..., bit 4 may be allocated to the strong group 902, and bit 5, bit 6, ..., bit 8 may be allocated to the middle group 904.

The group allocation 908 may result in an antenna allocation 910 for the first transmission. For example, bit 1, bit 2, bit 5, bit 6, bit 9, and bit 10 may be allocated to a first transmitting antenna (antenna 1), and bit 3, bit 4, bit 7, bit 8, bit 11, and bit 12 each may be allocated to a second transmitting antenna (antenna 2).

During the retransmission, shown in FIG. 9B, a circular shift may be performed on the significant bits, i.e., bit 1, bit 2, ..., bit 8, similar to the circular shift described above in, e.g., FIG. 6B, which may result in a group allocation 912. In the group allocation 912, ones of the significant bits that are allocated to the strong group 902 during the first transmission, i.e., bit 1, bit 2, ..., bit 4, are allocated to the middle group 904, and ones of the significant bits that are allocated to the middle group 904 during the first transmission, i.e., bit 5, bit 6, ..., bit 8, are allocated to the strong group 902.

In exemplary embodiments, an additional circular shift may be performed on the significant bits and the non-significant bits to further achieve a diversity gain, which may result in a group allocation 914. For a MIMO system with multiple transmitting antennas, a length of bit shift for the addition circular shift may be $2*k$, where $k=1, 2, \ldots,$ or $Nt-1$ ($Nt$ is a total number of the transmitting antennas). In the illustrated embodiment, k is chosen to be one. As a result, after the additional circular shift, bit 3, bit 4, ..., bit 6 are allocated to the strong group 902, bit 7, bit 8, bit 1, and bit 2 are allocated to the middle group 904, and bit 11, bit 12, bit 9, and bit 10 are allocated to the middle group 906.

The group allocation 914 may result in a subcarrier allocation 916 for the retransmission. For example, bit 3, bit 4, bit 7, bit 8, bit 11, and bit 12 may be allocated to the first transmitting antenna (antenna 1), and bit 5, bit 6, bit 1, bit 2, bit 9, and bit 10 may be allocated to the second transmitting antenna (antenna 2). Compared with the antenna allocation 910 (FIG. 9A) for the first transmission, the antenna allocation 916 achieves a diversity gain for the retransmission.

In exemplary embodiments, a general equation may be used to implement bit interleaving. For example, the general equation may be expressed as follows:

$$C_i = Q + \left(\left(\left(P - D_{(k,T_{(Ns)},P,L,m,N_{RB})}\right) + (j - Q)\right) \bmod P\right), \quad (1)$$

where $$\begin{cases} P = N_{EP}, Q = 0, & \text{for } 0 \le j < N_{EP} \\ P = (L - N_{EP}), Q = N_{EP}, & \text{for } N_{EP} \le j < L; \end{cases}$$

$j = \lfloor i/(m/2) \rfloor + \lfloor L/(m/2) \rfloor \cdot \lfloor (i \bmod (m/2)) \rfloor$, where "$\lfloor \ \rfloor$" denotes a floor operation and "mod" denotes a modulo operation;
i=0, 1, 2, . . . , (L−1);
$C_i$: bit indexes of the coded bits to be transmitted as a coded packet, e.g., $C_i$=0 for bit 0;
P: the number of significant or non-significant bits;
Q: a pre-defined starting index;
$D_{(k,T_{(Ns)},P,L,m,N_{RB})}$: a circular shift length, may relate to k, $T_{(Ns)}$, P, L, m and $N_{RB}$;
$N_{EP}$: the number of bits (significant bits) in an encoder packet (before encoding);
k: the number of transmissions in an HARQ process;
$T_{(Ns)}$: a function of additional shift length, may relate to Ns;
Ns: the number of data streams for the coded packet;
L: the number of coded bits for the coded packet;
$N_{RB}$: the number of resource blocks for the coded packet; and
m: the modulation order for the coded packet.

Figure 10:
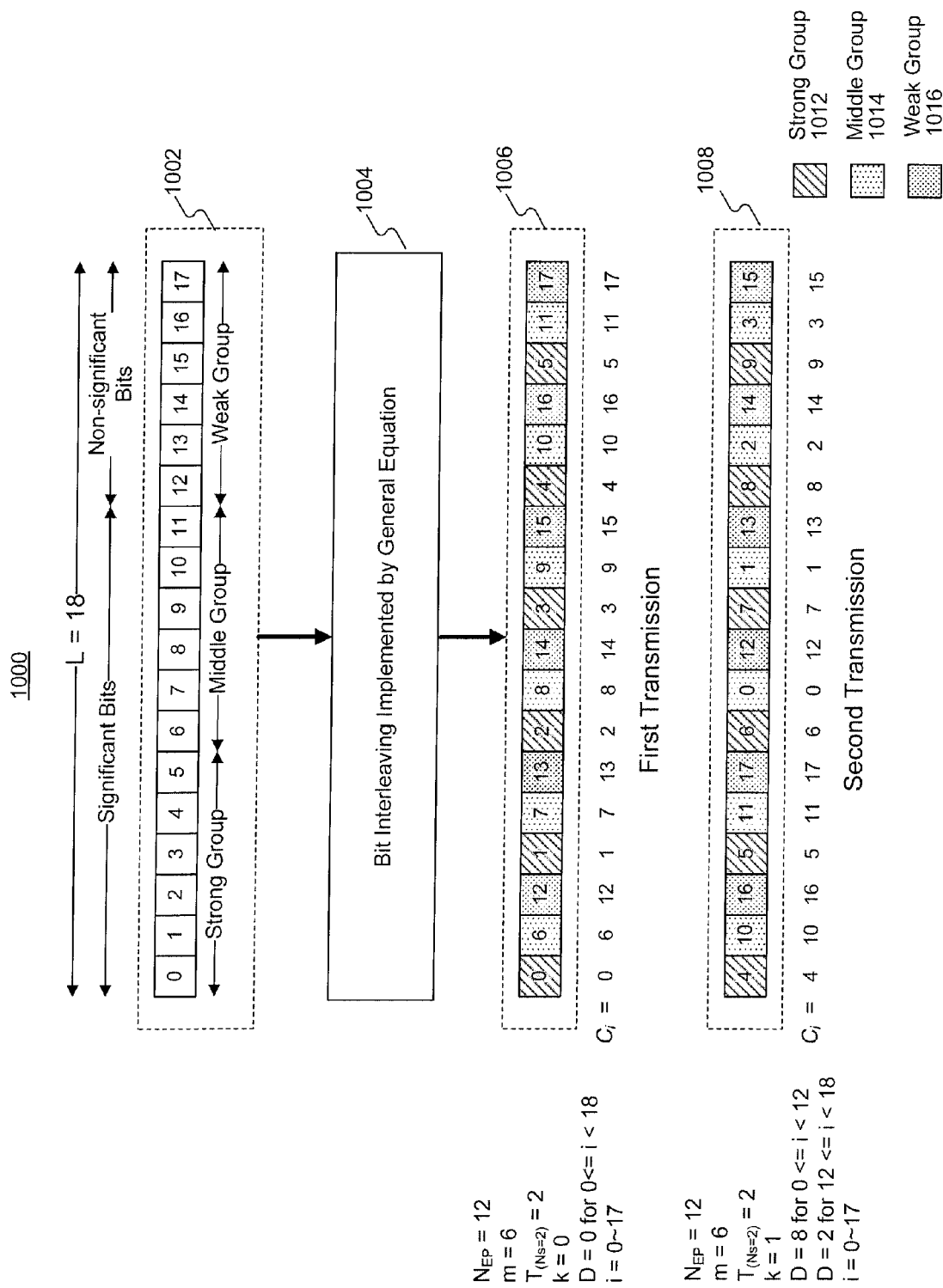
FIG. 10 illustrates a method for using a general equation to implement bit interleaving, according to an exemplary embodiment.

FIG. 10 illustrates a method 1000 for using the general equation, i.e., equation (1), to implement bit interleaving, according to an exemplary embodiment. For example, a plurality of coded bits such as bit 0, bit 1, . . . , and bit 17, included in a coded packet 1002, are to be transmitted based on the HARQ scheme. For convenience of illustration, bit 0, bit 1, . . . , bit 11 are assumed to be significant bits and bit 12, bit 13, . . . bit 17 are assumed to be non-significant bits. It is further assumed that the coded bits are to be allocated to a strong group 1012, a middle group 1014, and a weak group 1016. Based on equation (1), interleaving of the coded bits may be implemented for a first transmission and following retransmissions such as a second transmission (1004).

In one exemplary embodiment, $D_{(k,T_{(Ns)},P,L,m,N_{RB})}$ in equation (1) may be calculated by the following equation:

$$D_{(k,T_{(Ns)},P,L,m,N_{RB})} = (k \cdot (P - (\lfloor (P-1)/(L/(m/2)) \rfloor) \cdot (L/(m/2)) + T_{(Ns)})) \bmod P \quad (2)$$

Values of those parameters in equation (1) are shown in FIG. 10 for the first and second transmissions. Therefore, based on equations (1) and (2), $C_i$ may be calculated for the first and second transmissions. As a result, a first allocation 1006 of the coded bits may be determined for the first transmission, and a second allocation 1008 of the coded bits may be determined for the second transmission.

Other embodiments of the invention will be apparent to those skilled in the art from consideration of the specification and practice of the invention disclosed here. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting data represented by a plurality of coded bits, the method comprising:
    performing a circular shift, with a variable length related to a modulation order and a number of transmissions, on ones of the plurality of coded bits; and
    transmitting the circularly shifted ones of the plurality of coded bits.

2. A method for transmitting data represented by a plurality of coded bits, the method comprising:
    allocating ones of the plurality of coded bits, the allocating resulting in a circular shift, with a variable length related to a modulation order and a number of transmissions, of the ones of the plurality of coded bits; and
    transmitting the allocated ones of the plurality of coded bits.

3. The method of claim 2, wherein the allocating comprises:
    generating a reordered index sequence of the ones of the plurality of coded bits; and
    allocating the ones of the plurality of coded bits based on the reordered index sequence.

4. A transmitter to transmit data represented by a plurality of coded bits, the transmitter comprising:
    a processor included in the transmitter, the processor being configured to perform a circular shift, with a variable length related to a modulation order and a number of transmissions, on ones of the plurality of coded bits; and
    transmit the circularly shifted ones of the plurality of coded bits.

5. A transmitter to transmit data represented by a plurality of coded bits, the transmitter comprising:
    a processor included in the transmitter, the processor being configured to allocate ones of the plurality of coded bits, the allocating resulting in a circular shift, with a variable length related to a modulation order and a number of transmissions, of the ones of the plurality of coded bits; and
    transmit the allocated ones of the plurality of coded bits.

* * * * *